July 4, 1961
N. STEVENS
2,990,746
TOGGLE BOLT ASSEMBLY
Filed April 20, 1959
2 Sheets-Sheet 1
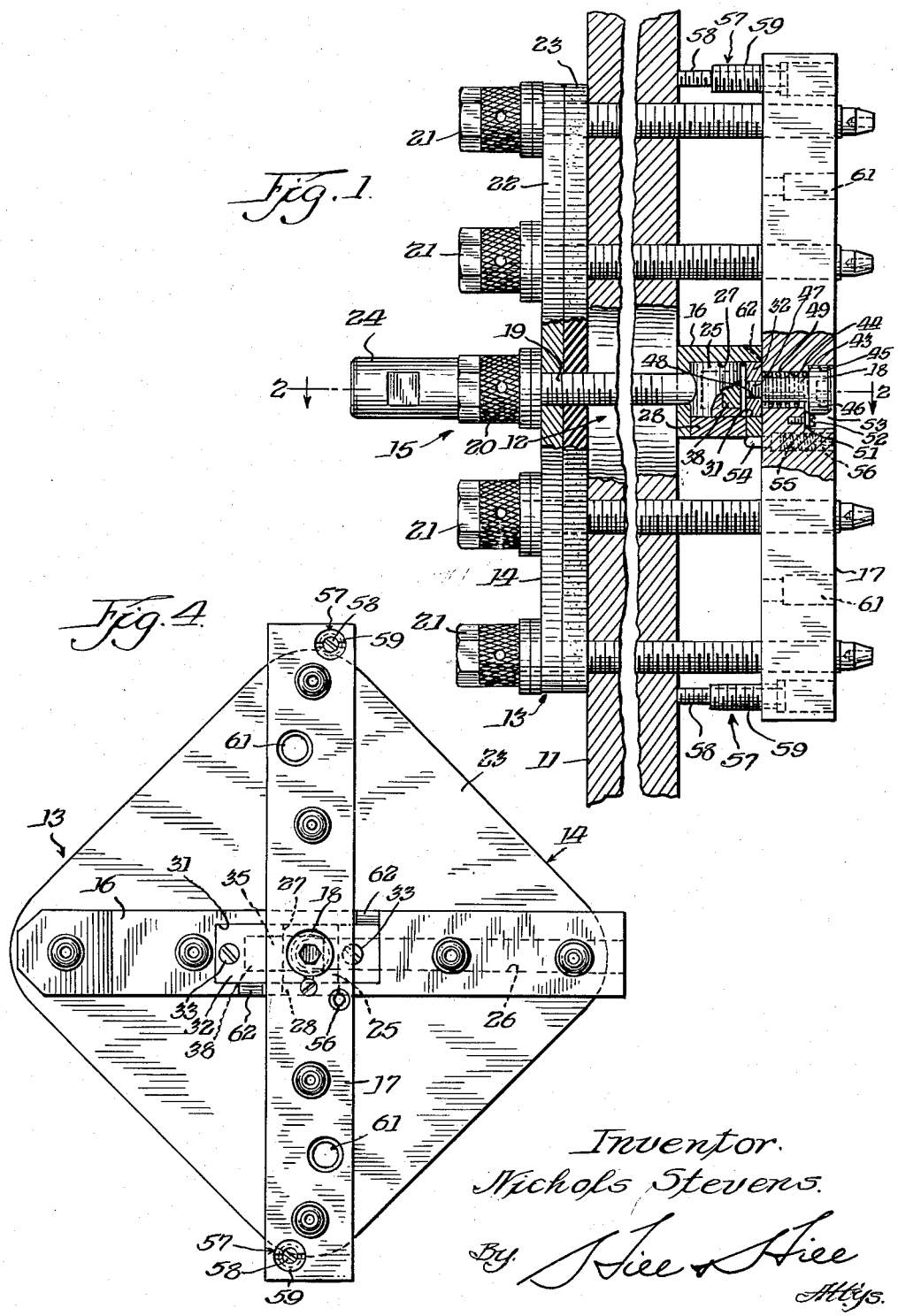
Inventor.
Nichols Stevens.
By Hiee & Hiee
Attys.

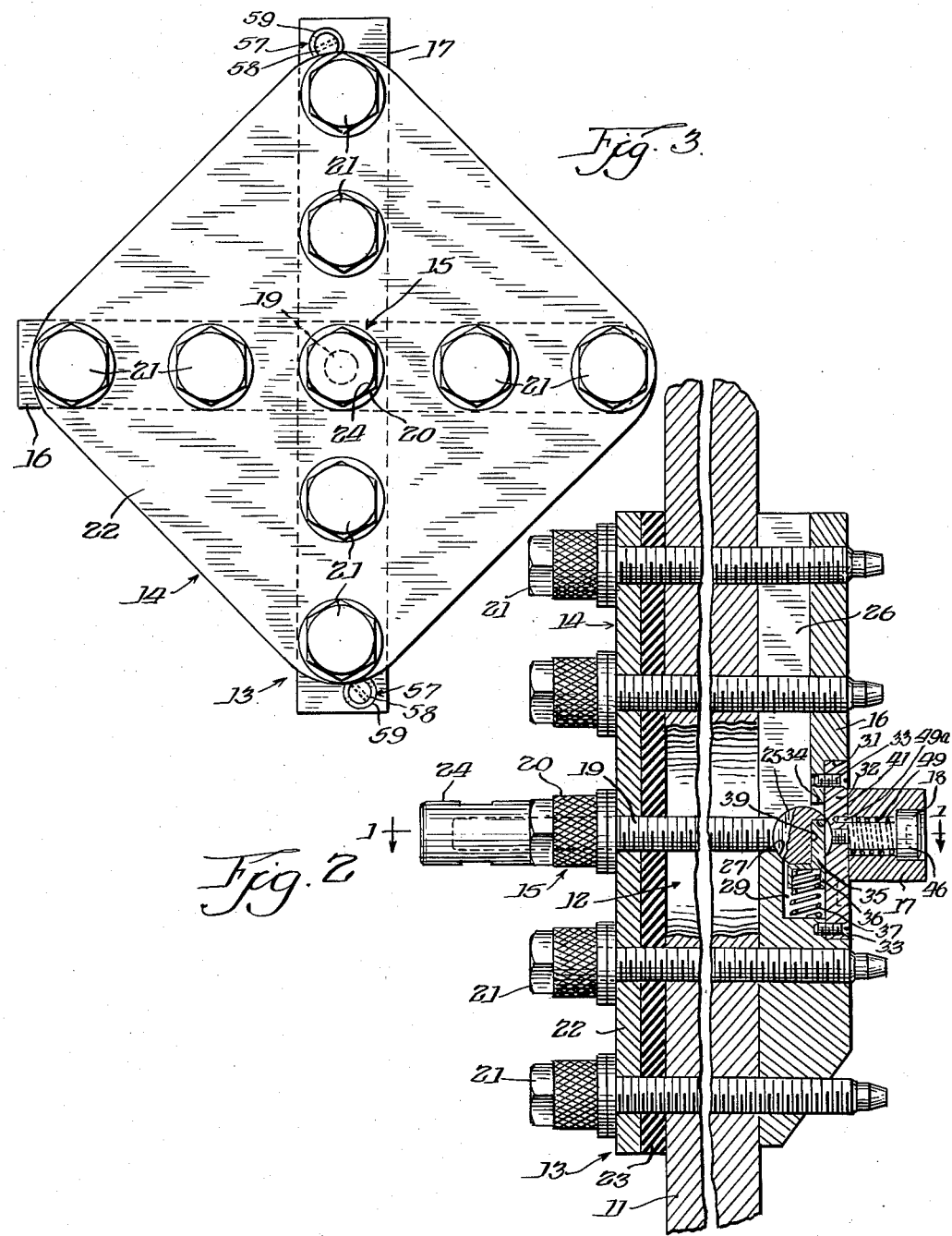

United States Patent Office 2,990,746
Patented July 4, 1961

2,990,746
TOGGLE BOLT ASSEMBLY
Nichols Stevens, 2414 N. Spaulding Ave., Chicago, Ill.
Filed Apr. 20, 1959, Ser. No. 807,618
2 Claims. (Cl. 85—3)

The invention relates generally to hole sealing devices and the like, and more particularly to hole sealing devices for use in closing an opening in a wall structure or the like having only one accessible side or face.

The invention is an improvement on a hole sealing device illustrated in my prior Patent No. 2,673,002, issued on March 23, 1954, and particularly adapted for use on high pressure boilers and other similar structures.

The present invention has among its objects, the production of a hole sealing device which has the advantage of the structure illustrated in the above referred to patent and which is considerably stronger and more durable than the patented device, at the same time providing a construction that is simpler and easier to manufacture than the previous construction.

Many other objects and advantages of the present invention will be obvious to those skilled in the art from the disclosure herein given.

In the drawings wherein like reference characters indicate like or corresponding parts:

FIG. 1 is a sectional view taken approximately on the line 1—1 of FIG. 2;

FIG. 2 is a sectional view taken approximately on the line 2—2 of FIG. 1;

FIG. 3 is a plan or face view of the exterior side of the device when mounted; and FIG. 4 is a plan or face view of the interior side of the device when mounted.

The present invention embodies a toggle bolt assembly and sealing gasket structure, the toggle bolt assembly including an attaching stem which is secured to a first cross arm structure which in turn is operatively connected to a second cross arm structure, the two cross arm structures being normally biased in transverse positions but adapted to be rotated into a generally parallel relationship, and the attaching stem being pivotal to a position adjacent to the first cross arm structure. The cross arm structures are constructed to receive a plurality of mounting bolts or the like which, together with the attaching stem, are operative to secure a sealing gasket structure to the cross arm structure, the latter first being inserted in the opening which is to be sealed, whereby such opening is positioned beneath the gasket structure and clamped between the latter and the toggle assembly. The construction thus far described is common to both the patented construction heretofore referred to and that of the present invention, the latter, however, providing an improved connection between the attaching stem and the first cross arm structure, as well as an improved connection between the cross arm structures.

Referring to the drawings, and more particularly to FIGS. 1 and 2, the reference numeral 11 indicates generally a wall structure having an opening 12 therein, which is to be sealed by means of a hole sealing device indicated by the numeral 13 and comprising a sealing gasket structure 14 which is operatively held in place by a toggle bolt assembly indicated generally by the numeral 15 and comprising a pair of generally rectangular cross arm members 16 and 17 pivotally connected by a screw 18, the member 16 being provided with a transversely extending attaching stem 19 which extends through the opening 12 and a hole in the gasket structure 14 and secured in place by a nut 20. As illustrated in FIGS. 3 and 4, the arms 16 and 17 are adapted to be disposed at substantially right angles following the insertion of the device in the opening, and secured to the gasket member 14 by bolts 21 threaded into respective bores in the arms 16 and 17.

The gasket structure 14 comprises a generally square shaped plate member 22 to which is suitably secured, as for example, by adhesives or vulcanizing, a layer 23 of semi-resilient gasket material. If desired, the free outer end of the stem 19 may be protected by a suitable cap member 24 threaded thereon.

Referring particularly to FIGS. 1 and 2, the inner end of the attaching stem 19 is provided with a generally cylindrical shaped head 25, the axis of which extends at right angles to the axis of the stem 19, the head and stem being illustrated as of integral construction. The stem extends through a longitudinally extending slot 26 formed in the cross member 16, the transverse width of the slot 26 being slightly larger than the diameter of the stem, whereby the latter may be pivoted to a position closely adjacent the member 16, the bulk of the stem extending longitudinally in the slot 26 in the manner illustrated and described in connection with the patented structure heretofore referred to. The head 25 of the stem is positioned in a cylindrical bore 27 which extends at right angles to the longitudinal axis of the member 16 and slot 26, the bore 27 being formed by drilling and end milling from one side of the member 16, as will be clear from a reference to FIG. 1, the outer end of the bore being closed by a suitable plug 28.

Referring to FIG. 2, the member 16 may also be provided with a small longitudinally extending recess 29 of generally rectangular cross section which opens at one end on the cylindrical bore 27, and provided with a larger generally rectangular shape portion 31 in which is positioned a more or less complementally shaped plate 32, the outer face of which is flush with the adjacent face of the member 16, the plate 32 being secured to the member 16 by suitable means such as a pair of screws 33 extending through the plate and threaded into the member 16. Referring to FIG. 1, it will be noted that the width of the recess 31 is substantially the same as the axial length of the cylindrical head 25 and the portion 31 intersects the bore 27, the adjacent end edge 34 of the member 16 being spaced from the axis of the stem slightly more than the radius of the head 25, so that the head may be withdrawn through the portion 31 out of engagement with the member 16. Positioned in the recess 29 is a generally rectangular shaped slide member 35 having a bore 36 therein in which is seated one end of a compression spring 37, the latter having its opposite end bearing on the adjacent end wall of the recess to bias the slide member 35 in a direction toward the head 25. The adjacent end of the member 35 is provided with a projection or tongue 38 which is positioned in a complementally formed recess 39 in the head 25, the extreme end of the tongue 38 engaging a shoulder 41 formed on the head, the construction being such that the spring 37 urges the member 35 toward the head 25, with the tongue 38, through the shoulder 41, imparting a torque to the head 25 and stem 19, tending to rotate the latter in a counterclockwise position as viewed in FIG. 2.

As illustrated in the latter figure, the adjacent inner face of the retaining plate 32 may be provided with a semi-cylindrical recess 42 therein adapted to receive the adjacent portion of the head 25 when the stem is rotated into the slot 26.

As illustrated in FIGS. 1 and 2, the bolt 18 which secures the member 17 to the member 16 may be provided with a shank portion 43 which extends through a bore 44, having a counterbore 45 therein of a size to receive the head 46 of the screw, the extreme free end of the latter being provided with a threaded portion 47 of reduced diameter to form a shoulder which bears on the plate 32, the end 47 being engaged in a threaded bore 48 formed in the plate 32. Encircling the stem 43 is a torsion spring 49 having the inner end 49a thereof extending axially into a small bore in the plate 32 and the opposite end formed with an eye 51 secured to the member 17 by a screw 52 positioned in a counterbore 53 which intersects the counterbore 45.

In assembling the toggle assembly 15, the attaching stem 18 is first inserted through the slot 26, the head 25 positioned in the bore 28, following which the spring 37 and member 35 are operatively positioned in the recess 29 and the plate 32 secured to the member 16 by screws 33. The spring 49 is then inserted in the bore 44, the eye 51 thereof positioned in the counterbore 53 and secured to the member 17 by the screw 52, following which the screw 18 is inserted in the bore 44 and the threaded end 47 thereof engaged with the plate 32 as illustrated in FIGS. 1 and 2. The member 17 may then be rotated in a direction clockwise as viewed in FIG. 4 to tension the spring 49, whereby the latter will tend to rotate the member 17 in a counterclockwise direction as viewed in FIG. 4, such rotation being limited by a spring biased detent 54 which is adapted to engage the adjacent face of the member 16 as illustrated in FIG. 1, the detent 54 being biased by the spring 55 which is held in operative position by a screw 56.

The cross arm 17 is provided with a pair of strain transmitting structures indicated generally by the numeral 57, each comprising a pair of concentric threaded members 58 and 59, the latter being threaded into the arm 17, which can be adjusted to operatively engage the inner face of the wall surface to which the device is applied, and in the event that the latter for some reason will not permit the structure 57 to be positioned as illustrated in the drawings, the member 17 is provided with a pair of additional openings 61 for reception of the structures 57.

The construction illustrated in the drawings is inserted through the opening 12 in the same manner as described in said prior patent, the cross arm 17 being rotated to a position more or less parallel to the member 16, the corner portions of the member 16 being beveled as indicated at 62 operative to cam the pin 54 inwardly and permit the arm 17 to assume such a position with respect to the arm 16. The attaching stem 19 is then pivoted toward the slot 26 as far as it will go and the compact assembly then inserted into the hole 12, while grasping the stem 19, and upon insertion of the two cross arms, the arm 17 is free to move under the action of the spring 49 to a position transverse to that of the arm 16 as illustrated in FIGS. 3 and 4. The stem 19 is then inserted through the gasket structure 14 and the mounting bolts 21 inserted through holes previously formed in the side wall 11 and engaged in the threaded bores provided therefor in the arms. After the nut 20 and bolts 21 have been drawn down tight, the cap 24 may be applied to the free end of the stem 19.

It will be appreciated that the cylindrical head construction of the attaching stem and cooperable structure of the arm 16 provides a very efficient and durable connection which is comparatively easy to fabricate, eliminating the spherical surfaces utilized in the prior patented construction. Likewise a very effective connection between the arms 16 and 17 is provided, all of the working parts being substantially concealed and protected.

Having thus described my invention, it will be obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a toggle bolt assembly, the combination of a pair of cross arms, an attaching stem having a cylindrical head at one end integrally connected therewith the axis of which extends at right angles to the stem axis, said head being of greater diameter than that of the stem, one of said cross arms having a longitudinally extending slot in one face thereof, said arm having a cylindrically shaped recess therein intersecting said slot and of a size to complementally receive said head with the axis of the latter extending transverse to said slot and the stem extending from said slot and pivotal about the axis of said head from a position substantially perpendicular to the longitudinal axis of said arm to a position extending along said slot adjacent said arm, said arm having a recess opening on the side of said arm opposite to that having said slot and providing access for the assembly of said stem therewith, a slide member positioned in said recess movable on an axis extending in the same direction as said longitudinal axis into engagement with a shoulder formed on said cylindrical head, a compression spring operatively engaged with said member to move the same in such direction operatively to apply a torque on said attaching stem to urge the latter in a normal position substantially at right angle with respect to said arm axis, a cover plate secured to said arm and closing said recess, and means carried by said cover plate for supporting said other cross arm for pivotal movement relative to said first mentioned cross arm on the axis of said stem when the latter is in its normal position.

2. In a toggle bolt assembly, the combination of a pair of cross arms, an attaching stem having a cylindrical head at one end integrally connected therewith the axis of which extends at right angles to the stem axis, said head being of greater diameter than that of the stem, one of said cross arms having a longitudinally extending slot in one face thereof, said arm having a cylindrically shaped recess therein intersecting said slot and of a size to complementally receive said head with the axis of the latter extending transverse to said slot and the stem extending from said slot and pivotal about the axis of said head from a position substantially perpendicular to the longitudinal axis of said arm to a position extending along said slot adjacent said arm, said arm having a recess opening on the side of said arm opposite to that having said slot and providing access for the assembly of said stem therewith, a slide member positioned in said recess movable on an axis extending in the same direction as said longitudinal axis into engagement with a shoulder formed on said cylindrical head, and a compression spring operatively engaged with said member to move the same in such direction operatively to apply a torque on said attaching stem to urge the latter in a normal position substantially at right angle with respect to said arm axis, a cover plate secured to said arm and closing said recess, said second arm having a bore therein, a shouldered screw positioned in said bore and operatively connecting said arms for relative pivotal movement about the axis of said screw, said plate having a threaded bore therein coaxial with the axis of said stem when the latter is in said normal position and of a size to receive said screw, a torsion spring encircling said screw having one end secured to said plate and the other to said second arm operative to effect relative rotation between said cross arms about said screw axis, and stop means carried by one of said arms engageable with the other arm to restrict relative rotation therebetween when the arms are transverse to one another.

References Cited in the file of this patent
UNITED STATES PATENTS

| | | |
|---|---|---|
| 701,691 | Engelhardt | June 3, 1902 |
| 1,453,916 | Cashmer | May 1, 1923 |
| 2,673,002 | Stevens | Mar. 23, 1954 |